United States Patent [19]
Huffman

[11] 3,850,592
[45] Nov. 26, 1974

[54] HEAT PUMP DRYER

[75] Inventor: Lowell E. Huffman, Wilmington, Del.

[73] Assignee: Deltech Engineering, Inc., New Castle, Del.

[22] Filed: Nov. 24, 1972

[21] Appl. No.: 309,007

[52] U.S. Cl.............................. 55/33, 55/62, 55/179, 55/208
[51] Int. Cl............................................ B01d 53/04
[58] Field of Search ........... 55/33, 62, 179, 208, 76; 62/13, 17, 94, 271

[56] References Cited
UNITED STATES PATENTS

| | | | |
|---|---|---|---|
| 3,063,247 | 11/1962 | Yendau................................... | 62/13 |
| 3,225,517 | 12/1965 | Wachsmuth............................ | 55/33 |
| 3,264,803 | 8/1966 | Read...................................... | 55/208 |
| 3,292,346 | 12/1966 | Adams.................................... | 55/33 |

*Primary Examiner*—Charles N. Hart
*Attorney, Agent, or Firm*—Synnestvedt & Lechner

[57] ABSTRACT

A method and apparatus for removing a vapor component from a gas stream by condensation and adsorption is disclosed. According to the disclosure the gas stream is cycled through a pair of vessels each housing refrigeration equipment including an evaporator for cooling the gas stream to a temperature at which substantial portions of the component are removed by condensation of the same. Each vessel also is provided with a bed of dessicant or other adsorptive material, e.g. silica gel, for removing the remainder of the component from the stream. A controller is provided for flowing the gas stream through one vessel until the bed of adsorptive material reaches a predetermined level of saturation at which point the flow of gas is directed through the other vessel. The latent heat of condensation is used to regenerate the offstream desiccant bed. Heat transfer means are arranged in such manner as to optimize the performance of the adsorbent and to achieve a regeneration of the offstream bed with minimal temperature differences in that bed. Use of a portion of the product gas to flush the offstream bed is also disclosed.

23 Claims, 3 Drawing Figures

| VALVE | 31 | 30 | 53 | 54 | 44 | 38 | |
|---|---|---|---|---|---|---|---|
| OPEN | | X | X | | | | LEFT VESSEL DRYING |
| CLOSED | X | | | X | X | X | RIGHT VESSEL REGENERATING |

| VALVE | 31 | 30 | 53 | 54 | 44 | 38 | |
|---|---|---|---|---|---|---|---|
| OPEN | X | | | X | X | X | LEFT VESSEL REGENERATING |
| CLOSED | | X | X | | | | RIGHT VESSEL DRYING |

HEAT PUMP DRYER

FIELD OF THE INVENTION

This invention relates to the separation of components from a gas stream and more particularly to the removal of components which are separable by condensation and adsorption. Although the invention has application in the removal by condensation and adsorption of a wide variety of components from gas streams, an important field of use of the invention is the removal of water vapor from compressed air.

BACKGROUND OF THE INVENTION AND THE PRIOR ART

The condensation of water vapor that is present for example, in compressed air and natural gas pipe lines and the like is a problem which is of considerable importance to industry. Water vapor in compressed air lines creates constant maintenance problems due to the corrosion of parts and equipment and can be the source of expensive disturbances in systems which are controlled by compressed air. Moisture causes rejects when painting is done by compressed air powered spray painting equipment and may contaminate chemical solutions which are agitated by compressed air. A most troublesome problem is that of freezing of outside air lines thereby interrupting the flow of compressed air when temperatures drop below 32°F.

Many produces are available for removing moisture from compressed air. Categories of equipment available include deliquescent dryers which use a hydroscopic material for adsorbing the water vapor from the compressed air mixture. Deliquescent dryers are suitable where a modest degree of dew point depression is required and are generally low in original cost. However, the replacement of the deliquescent material means that operating costs are relatively high.

Other types of drying apparatus include refrigerated dryers which use a refrigerant to cool compressed air and remove moisture via condensation. These units are effective for the removal of large amounts of water from compressed air lines but in the case of the removal of water vapor they are limited in dew point reduction to the freezing point of water.

Various types of dryers utilizing an adsorptive material which is insoluble in the component being removed, for example, water vapor, are known. These units commonly employ a desiccant such as activated alumina or silica gel and have the capacity of reducing the moisture content of a compressed air mixture to a very low level. However, as they adsorb water molecules from the compressed air they themselves become moisture laden and eventually saturated. When this occurs, the adsorption process stops and some means must be employed to regenerate the saturated material.

It has become common practice to use two beds of adsorbent material and to regenerate one bed while the other is on the drying phase of a cycle. Regeneration of so-called "heat regenerated or temperature swing dryers" is done by heating the offstream bed and usually by carrying off the moisture by flushing the bed with a portion of the product gas. So-called heaterless or pressure swing dryers rely on the use of a stream of relatively low humidity gas for regenerating the offstream bed.

Although the heaterless dryers are capable of removing moisture in an air stream to the point where the air contains less than one part per million of water vapor, usually a substantial portion of the dry product air is required for regneration purposes. The expense of regenerating gas limits the use of heaterless dryers to those applications where gas outputs of no more than a few hundred s.c.f.m. are involved.

Heat regenerated dryers must use a source of heat energy for regeneration of an offstream bed of adsorptive material. Typically the regeneration energy is supplied by electrical resistance heaters which have a high initial cost and a high operating cost. Moreover, it has been found that adsorptive materials like silica gel operate best at relatively low temperatures. By way of example of some of the problems involved, consider the case of a compressed air dryer operating when the air temperature at the inlet to the dryer is at a typical level of about 100°F. As moisture in the air is adsorbed by the bed of desiccant, the latent heat of the condensing moisture elevates the temperature of the desiccant to the temperature of the inlet gas and the capacity of the bed to adsorb moisture is reduced. When the ability of the bed to adsorb moisture is sufficiently reduced, the regeneration phase starts and the desiccant must be heated by the electric heaters to a temperature level of between 375° to 400°F., if it is desired to restore the moisture adsorption capability of the desiccant to a typical dew point level of minus 40°F in a reasonable period of time. Obviously, the desiccant can not be switched to the drying portion of its cycle until it is cooled and cooling must be effected by the use of cooling water, ambient air or large amounts of purge air. Because of the time and expense involved in cooling the desiccant, the cycle is shifted before the temperautre of the regenerated bed is returned to the temperature of the inlet air. It can be seen therefore that there is some sacrifice in moisture removal when the bed is placed onstream again at least until the temperature of the bed again comes into equilibrium with the temperature of the inlet air.

An example of a heaterless dryer of the kind referred to above is described in Skarstrom U.S. Pat. No. 2,944,627. Heat regenerated dryers are disclosed in Kahle U.S. Pat. No. 2,661,808 and Parks U.S. Pat. No. 2,765,868. The dryer in the above-identified Kahle patent creates a temperature differential across the bed as a means of optimizing adsorption and desorption of the component being separated from the gas stream. A dryer disclosing a refrigerated dryer in series with a heat regenerated type dryer is disclosed in Jackson U.S. Pat. No. 3,477,204.

SUMMARY AND OBJECTS OF THE INVENTION

The present invention involves the use of a separations method and apparatus consisting of a cooling section or zone for removal of water vapor or other condensable components followed by an adsorption section or zone for removal of the remainder of the water vapor or other adsorbable component. The invention is based on the utilization of two principles. The first of these is that the separation of vapor from a compressed air or other gas stream by cooling and condensation involves the removal of significant amounts of energy. This energy is usefully employed for the purposes of regenerating a bed when it becomes saturated and reheating the product air to its inlet temperature. The second is that the adsorptive capacity of a desiccant is inversely proportional to temperature. In other words, as the bed get colder, it can adsorb greater quantities of vapor. Further as the gas is cooled, there is less vapor to be adsorbed. The combination of a cooling zone and an adsorption zone is an ideal one, the cooling effect of the refrigerant being used to make a bed of adsorptive material function to best advantage.

Thus, according to one aspect of the invention, the energy removed in the cooling section during cooling and condensing of a component of a gas stream is used to regenerate the adsorbent material in an offstream bed.

In accordance with another aspect of the invention, the cooling section is arranged in intimate heat transfer relationship with a bed of desiccant or other adsorptive material. By virtue of this arrangement, the bed is cooled not only by the flow of gas from the cooling section but by virtue of its proximity to the cooling coils in the cooling section and thereby operates in a highly efficient manner.

An important object of the invention is the provision of a method and apparatus for separating components from a gas stream by condensation and adsorption which results in significantly lower operating costs than is possible with prior art separations equipment.

Another object of the invention is the provision of a desiccant type separations apparatus which requires materially smaller quantities of desiccant for processing a given quantity of process gas.

Still another object of the invention is the provision of methods and apparatus for separating gas components which substantially minimizes the operational temperature range of the desiccant beds.

A further object of the invention is the reduction of costs of key components in the apparatus such as valves, control circuit components and the like.

Still another object of the invention is the provision of a gas component separation method involving separation by refrigeration and adsorption, which utilizes substantial portions of the heat energy evolved during a refrigeration step for the regeneration of saturated adsorptive material used in an adsorptive separations step.

A still further object of the invention is the provision of a separations apparatus which minimizes the problems of desiccant fouling and crazing occurring during the high temperature heating ordinarily required during regeneration of the desiccant.

Still another object of the invention is the provision of drying apparatus which is appreciably safer in many respects than conventional heat regeneration dryers.

Still another object of the invention is the provision of drying apparatus which utilizes adsorptive compounds at temperatures at which they most effectively function.

The above and various other objects of the invention appearing hereinafter are achieved by apparatus which comprise a gas refrigerating apparatus including evaporator means, means for circulating a refrigerant through said evaporator means, means for circulating the gaseous mixture past the evaporator means thereby cooling the mixture to a temperature at which a substantial portion of the component is condensed, a column filled with a material which is preferentially adsorptive of said component, gas delivery means between the refrigeration means and the column for circulating the gaseous mixture from the refrigerating means through the column a compressor for the refrigerant and heat transfer means in said column operative to transfer to the adsorbent material, heat adsorbed by the refrigerant from the gaseous mixture during cooling of the mixture when the column is not on stream. Methodwise, the invention comprises the passing of the gas stream through a refrigeration zone to cool the stream in order to condense a substantial poriton of a condensable component, passing the remainder of the stream through a bed of a material which is adsorptive of the component until the bed reaches a predetermined level of saturation of said component, and using heat energy given up by the gas stream as it is being cooled in the refrigeration zone to regenerate saturated adsorptive material.

Turning now to a detailed description of an illustrative embodiment of the invention, reference is made to the drawings wherein.

Figures 1, 3:
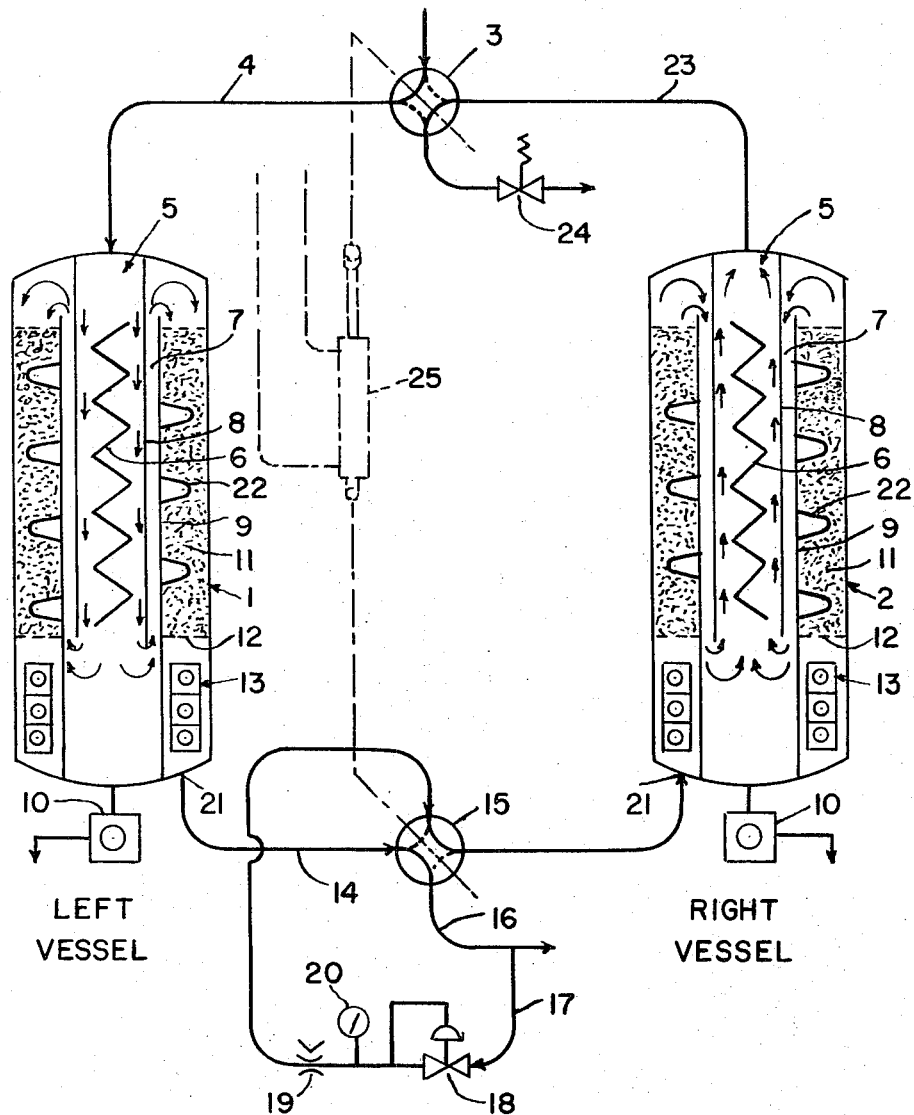
FIG. 1 is a schematic view of apparatus of the invention, illustrating the flow of gas through a treatment apparatus incorporating principles of the invention.
FIG. 3 is a chart showing the position of control valves in the refrigeration system during each phase of a cycle of operation.
Figure 2:
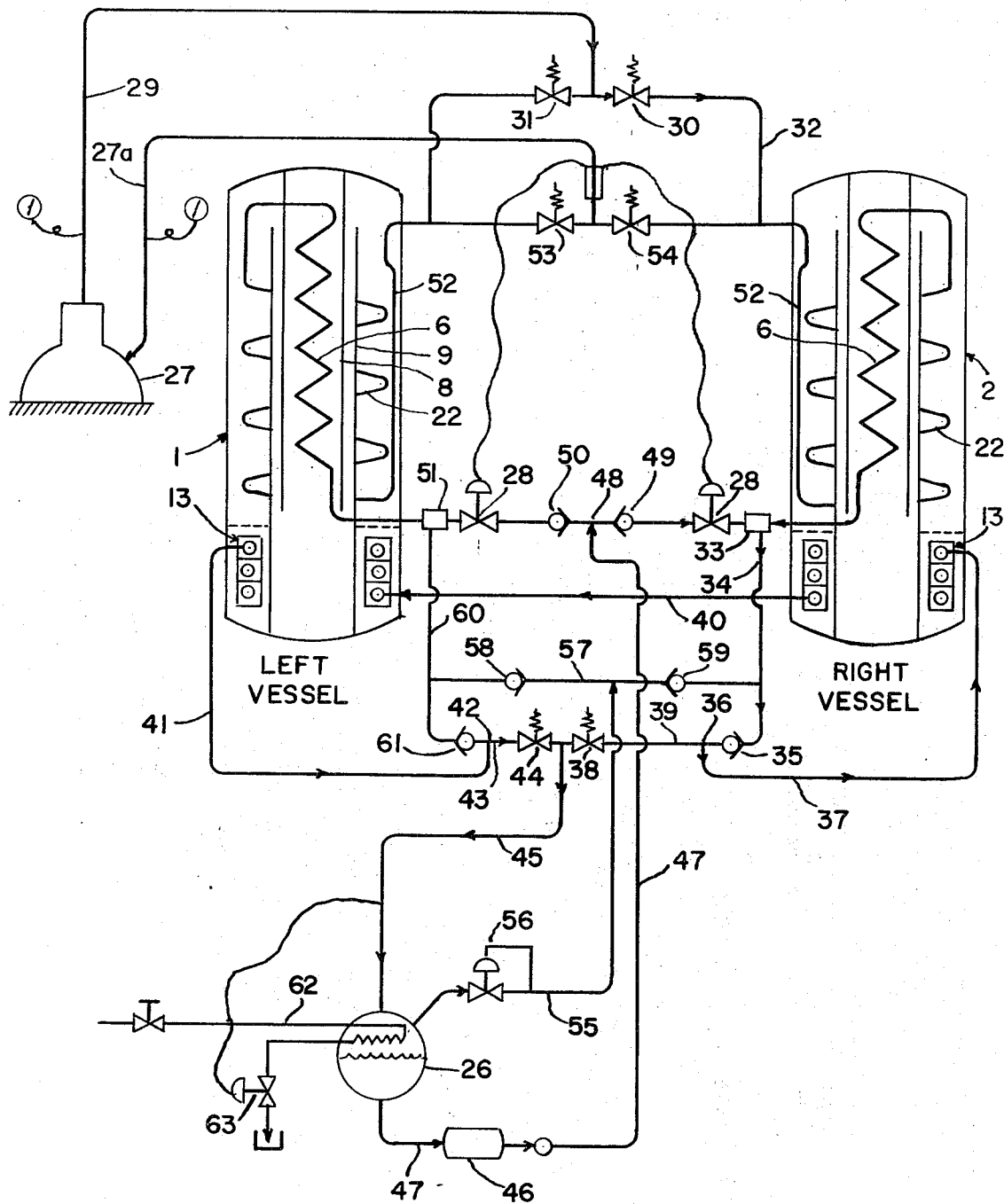
FIG. 2 is a diagrammatic view of apparatus constructed according to the invention showing refrigeration flow within the apparatus.

The illustrative embodiment of the invention comprises a pair of vessels 1 and 2 shown in FIGS. 1 and 2. The vessels are cyclically operated so that gas is first delivered to one vessel and then to the other. In the explanation which follows, the invention is used for the drying of compressed air and the lefthand vessel 1 should be considered to be on the drying mode and the righthand vessel 2 on the regeneration mode, unless otherwise stated.

In FIG. 1, certain components of the refrigeration system have been eliminated for ease in identifying and following the flow path of the gas being treated. The complete refrigeration system is shown in FIG. 2 and gas flow conduits are eliminated in that view to avoid confusion between the two systems.

Referring first to FIG. 1, the wet air enters the apparatus through a four-way valve 3 and is directed through suitable piping 4 to the top of the lefthand vessel 1. Although other forms of vessel may be provided, a preferred form as shown in FIG. 1 comprises a vertically oriented cylindrical column having an inlet located centrally of the top. Each vessel has a central cooling section 5 which extends lengthwise of the vessel and contains cooling tubes or coils 6 through which a suitable liquefiable refrigerant is circulated, providing a means of cooling the air and thereby condensing a substantial portion of the water vapor to be separated from the air. Preferably the cooling tubes or coils 6 extend throughout a substantial portion of the length of each vessel. The compressed air flows downwardly over the coils and thence upwardly through an annular chamber 7 formed by a cylindrical wall 8 which surrounds the cooling chamber and terminates short of the bottom of the vessel and a cylindrical wall 9 which extends from the bottom of the vessel upwardly and terminates short of the top of the vessel. In a typical case, wherein the inlet air temperature is about 90°F and the air temperature is reduced to 50°F in the cooling section, about 75 percent of the moisture content is removed during the cooling step of the process.

Means including a trap 10 of known type are provided for separating out the condensed vapor which accumulates in the bottom of the vessel.

According to the preferred form of the invention, a bed of an adsorptive material is located in each vessel in the space between the wall 9 and the vessel outer wall. Determination of the choice of adsorptive material is based on the affinity of the material for the component which is to be separated. Various materials including molecular sieves, alumina and silica gel ($SiO_2$) may be employed. In illustrative embodiment of the invention wherein water vapor is removed from a compressed air line, silica gel in granular form is employed.

As the air exits from the annular space 7 at the top of the vessel its direction is reversed and it is flowed downwardly through the adsorbent, which in indicated by the reference character 11 in the drawings. Substantially all of the moisture which remains in the gas after it leaves the cooling section will be adsorbed by the bed of silica gel as it flows through the bed. The cool dry air then flows through a foraminous plate 12 on which the bed is supported and is reheated by an air reheater comprising suitable exchanger tubes 13. The dry reheated air exits from the bottom of the vessel and flows through a conduit 14 through a four-way valve 15. Downstream from the four-way valve 15 the air flows through a conduit 16 where it is available for distribution and use.

Preferably, a portion of the product air is diverted through a branch line 17 and circulated through the offstream bed in order to purge that bed of adsorbed moisture. Pressure regulator valve 18 and adjustable flow control valve 19 are provided in line 17 in order to reduce the pressure and flow of gas to a level suitable for regeneration of the offstream vessel 2 which in FIG. 1 is the righthand vessel 2. A pressure gauge 20 is provided in the line.

Line 19 is connected to another port of the four-way valve 15 and flow thence proceeds through the valve to an inlet 21 at the bottom of the offstream vessel.

The interior of the righthand vessel 2 is identical in construction to the lefthand vessel 1 and in FIG. 1, like numbers are used to identify like parts in that vessel. Inlet 21 for the purge air connects with the outer annular space between the outer wall of the vessel and the interior wall 9.

It is further assumed for purpose of explanation, that the righthand vessel 2 was formerly onstream and that its bed of adsorptive material is in substantially saturated condition. The portion of the dry product air used for regeneration purposes first flows over the air reheater means 13 where further heat is added in order to increase the moisture holding capacity of the air thereby increasing its capacity to readsorb vapor from the saturated bed.

Located within each bed are suitable heat transfer means which are preferably in the form of heat transfer coils 22 which are embedded in and extend lengthwise of the bed. As will be described further hereinafter, the latent heat energy in the refrigerant supplies the heat energy for both heaters 13 and heat transfer means 22. It will be seen that the heat transfer means 22 are connected in the refrigeration circuit in suchh a way that they can perform two functions, namely cooling of the onstream bed, and heating of the offstream bed thereby restoring the silica gel or other desiccant to an unsaturated condition.

As indicated just above, an important source of thermal energy for regenerating the bed is provided by the heat transfer means comprising the heating coils buried in the bed. Thus the dry purge air and the heating of the bed combine to drive off the moisture in the bed in a highly effective manner. At the top of the bed the saturated air reverses direction and flows in a downward direction through thee annular space 7. The direction of flow is again reversed at the lower end of the cooling section 5 so that it flows upwardly and through section 5 and out through the top of the vessel 2, then through a line 23 through the valve 3 from which it is exhausted to atmosphere through a solenoid operated valve 24.

Solenoid valve 24 is open during the regeneration mode for each vessel to allow for the exhausting of purge air. Control means are provided which actuate the valve 24 to close the exhaust line at the end of the regeneration part of the cycle for each bed just prior to the time the vessel is turned onstream. Closing of this valve permits a buildup of pressure in the offstream bed before it is placed onstream, thereby preventing damage to the desiccant in the bed which might occur if a rapid pressure change from substantially atmospheric levels to operating pressure occurred.

Valves 3 and 15 are operated by suitable control means such as a reciprocal pressure operated cylinder 25 in a cyclic manner so that by the time the left vessel 1 becomes nearly saturated the flow of air from the inlet will be directed to regenerated bed 2 with a portion of the product gas being utilized to purge the bed in vessel 1 in the manner described above.

The optimum length of the cycle can be readily determined, dependent largely on the amount of silica gel or other adsorptive material in the column, flow rate, pressure of the inlet air and lowest temperature of the chilled air.

Attention is now directed to FIG. 2 which illustrates in schematic form the refrigerant flow in the preferred embodiment of the invention. As is evident from the above, the energy for cooling the air and for heating and regenerating a saturated bed is supplied by a refrigeration system which also functions as a heat pump.

As in the explanation of gas flow in FIG. 1, in the explanation to follow, it will be assumed that the left vessel 1 is on the drying mode and the adsorbent material in the right vessel 2 is undergoing regeneration.

In the preferred embodiment of the invention, a standard vapor-compression cycling system is employed, although other refrigeration systems which are capable of extracting heat from the gas stream and thereby effecting condensation of a key component of the gas stream and utilizing the latent heat extracted as herein described, may also be employed.

The basic elements of the refrigeration system include the coils 6, a condenser/receiver unit 26, a compressor 27, expansion valves 28 and suitable piping and valving interconnecting various parts of the system for circulating the refrigerant. Also incorporated in the system are heat transfer means comprised of coils 22 and heaters 13. Suitable refrigerants may be selected from a variety of those commonly available, a suitable one being freon 12.

Starting at the inlet to compressor 27, freon vapor in a line 27a is compressed and delivered through a line 29 to the inlet port of a pair of solenoid operated valves 30 and 31. At this point, the freon is hot, owing to the latent heat energy absorbed during the evaporation of the moisure in the gas and to compression by compressor 27.

When righthand vessel 2 is undergoing regeneration, valve 30 is open and valve 31 is closed. The high pressure-high temperature refrigerant thus flows through the valve 30 through a line 32 which is connected to the heat transfer means comprising the heating coil 22. Preferably the connection is at the bottom of the bed of adsorbent material so that the hottest part of the bed on the drying or regeneration phase and thus the first part to become unsaturated will be the bottom part.

The coil 22 extends lengthwise of the vessel and interconnects with the cooling coil 6. Coil 22 is preferably physically mounted within the bed so that the maximum amount of heat transfer between the coil, the bed and the purge air is achieved. As the silica gel adsorbent is heated it gives off the adsorbed vapor to the purge air and is gradually restored to an unsaturated condition with the moisture gradient proceeding from the bottom of the bed to the top during the regeneration phase of the cycle.

The refrigerant thereafter flows through the cooling coils 6 and this flow is preferably in the downward direction so that the refrigeration coils will be cleansed of oil or condensed liquid which may have accumulated in the coils during the cooling operation. Flow from the bottom of the cooling coils in the right-hand vessel is to a junction fitting 33 and from there downwardly through a line 34 through a check valve 35 to junction 36. From this point, the flow of refrigerant is through line 37 leading to the air reheater 13 in the righthand vessel. A solenoid operated valve 38 blocks flow in the line 39. The refrigerant is circulated through coils in reheater 13 and thus transfers more heat energy into the gas stream used to purge the saturated bed and thereby contributes to more rapid regeneration of the bed.

The air reheater at the bottom of the onstream bed (the left vessel during the phase of the cycle now described) is preferably connected in series with the air reheater at the bottom of the bed of vessel 2 via a line 40. The flow of warm refrigerant is thence also through the reheater in the onstream vessel and the balance of the thermal energy remaining in the high pressure refrigerant is used to heat the product air.

Flow from the heater 13 in the lefthand vessel is through line 41 to a junction 42 through line 43 through a solenoid operated valve 44 which is opened when the lefthand vessel is on the drying phase of the cycle and the righthand vessel is on the regeneration phase of the cycle. Valve 38 is closed during this phase of the cycle and flow is through line 45 to the inlet of the condenser/receiver. The refrigerant is cooled as necessary by the condenser/receiver and dried by means of a dryer 46 in line 47 and delivered to junction 48. Flow is prevented through check valve 49 since the refrigerant on the righthand side of the check valve is at a relatively high pressure as compared to refrigerant at 48. The refrigerant accordingly flows through check valve 50 through expansion valve 28, where it is vaporized, through junction point 51 and from thence to the bottom of cooling coil 6 in the left-hand vessel. The vaporized refrigerant absorbs heat from the air flowing downwardly through the cooling section as described above. At this point the cold refrigerant is preferably flowed through the coil 22 on the onstream bed which as indicated above aids in maintaining the silica gel at a relatively low temperature for optimum operation.

It should be noted that cooling of the silica gel is also accomplished because of heat transfer via conduction from the cooling coils 6 through the walls 8 and 9 and further through the cooled product air exiting from the cooling section. Since the efficiency of the bed of adsorbent material is inversely proportional to the temperature of the bed, maximum cooling is maintained through the use of these three means of cooling. The refrigerant exits from the coils 22 via a line 52 through a solenoid operated valve 53 and thence to the suction side of the compressor through the line 27a.

When the cycle shifts, the right vessel becomes the drying vessel and the left vessel goes offstream and undergoes regeneration. The various solenoid operated valves assume the positions in the lower section of the chart of FIG. 3.

During periods of low flow rate of the gas being processed, a freeze-up of a vessel is prevented by limiting the lower operating temperature of the refrigeration system. To accomplish this, a bypass means is provided, which includes a line 55 leading from condenser 26 in which is located a bypass valve 56. Bypass valve 56 is set at a pressure equivalent to 35°F when the system is used for the separation of water vapor from a gaseous stream. At this pressure, the valve opens and the hot refrigerant is circulated through the line 55 to a line 57 in which are located check valves 58 and 59. When left vessel 1 is onstream, flow is through check valve 58 since check valve 59 is held closed due to the presence of high pressure refrigerant in the line 34. Flow of the refrigerant is then through check valve 58 and upwardly through line 60 to the junction point 51 at which point the relatively warm refrigerant is mixed with the cold refrigerant flowing through expansion valve 28. Flow back to junction point 42 and thence back to the receiver is blocked by a check valve 61 which is held closed because of the pressure differential across the check valve.

Cooling of the condenser/receiver 26 is preferably accomplished by cooling water circuit 62. Flow of water in the cooling water circuit is controlled by a pressure responsive control valve 63 which opens when the refrigerant head pressure, as sensed in line 45 exceeds a preselected limit. When this limit is exceeded, more cooling water is circulated through the condenser as required to remove heat from the system and lower head pressure. This arrangement also functions in the manner of a resistance valve in the system. At low process gas flow rates the valve restricts the amount of cooling water and energy removal from the system. Continuing system energy input via the compressor brings the head pressure up and the energy available in the gaseous refrigerant will provide regeneration requirements.

An example of the advantages of the invention may be appreciated upon comparison of the following operational data obtained by use of a conventional twin bed heat regenerated desiccant dryer of conventional design and a heat pump dryer made in accordance with the invention. The example taken offers a comparison between the two systems in the drying of air at a drying rate of 1,000 s.c.f.m., i.e. 4,500 lbs. of air per hour to be dried.

Although the amount of water vapor in compressed air on any given day may vary over a wide range, the amount of 17.1 lbs. of water found in this example may be considered to be typical.

On a four hour drying cycle a heat regenerated dryer operating at 90°F requires 570 lbs. of silica gel desiccant. This amount of desiccant is typically provided in a vessel of 22 inches in diameter and a bed depth of 58 inches.

During the drying of one such bed a second offstream bed is on the regeneration phase. An air flow of 70 s.c.f.m. is required to purge the offstream bed of its moisture content. This requires 18 kilowatts, of electrical heater capacity which supplies 61,500 BTU an hour for a 3 hour period. The remaining 1 hour of the total 4 hour time available for regeneration purposes is required for cooling. During the heating phase the air approaches 500°F in order to provide the approximate 375° desiccant temperature for proper regeneration.

In the case of the heat pump dryer operating on a four hour cycle, processing of the same quantity of air containing the same amount of water at 90°F input air temperature is first cooled in the refrigeration zone to a temperature of 50°F. The cool air is directed through the adsorption zone where the desiccant in the bed removes the remainder of the moisture. Of the 17.1 lbs. of water per hour about 75° or 12.4 lbs. is discharged as condensate through the trap located below the cooling zone. The remaining 4.7 lbs. per hour of water is adsorbed in the desiccant. The refrigeration compressor used to provide the necessary cooling effect requires a 4 horsepower motor with the equivalent electrical capacity of 4.6 kilowatts. As little as 168 lbs. of desiccant is required to adsorb the remainder of the moisture in the air stream.

Regeneration of the alternate desiccant bed requires 40 to 50 s.c.f.m. of purge air. The high temperature freon from the discharge side of the compressor provides the heat energy. Heat energy absorbed by the refrigerant during the cooling process of the air stream provides 57,500 BTU per hour which is theoretically usable for regenerating the offstream bed, and reheating the process air to its input temperature. An additional 15,700 BTU per hour is added by the cranking energy of the compressor motor and although some of this energy is lost from the system, only 4,500 BTU's per hour are needed for regeneration. The surplus thermal energy can be tranferred to the process air stream at the exit of the dryer to reheat the air.

Dryers constructed according to the teachings of the invention may be operated at a much lower temperature range than is the case with conventional heat regenerated dryers. Typical minimum and maximum operating temperatures of 50°F and 130°F are employed in the treatment of air having an inlet temperature of 90°F as compared with minimum and maximum temperatures of 90°F to 375°F with heat regenerated dryers. At the lower regenerating temperatures feasible with the invention the problem of glazing of the desiccant from varnish in oil and the disintegration of the desiccant particles which occurs when the wide temperature variations are encountered is substantially eliminated. Actual amounts of desiccant per cubic feet of air treated are substantially reduced. Electric power requirements are appreciably lower with consequent reduction in the size of power transformers, transmission lines and switch gear.

With units constructed according to the invention shorter cycle times are achievable since a heated bed does not need to be cooled to operating temperature following the time that it is being purged.

An important advantage of the invention, as compared with heat regenerated dryers arise on account of the operating temperatures that are encountered as compared with the inlet air temperature. In the case of heat regenerated units, both drying and regeneration temperatures are necessarily above the temperatures of the inlet air. During the drying phase of a cycle it is desirable to keep the temperature as slow as possible so it is desirable to dissipate as much heat energy as possible to the surrounding atmosphere, whereas during the regeneration phase the dissipation of thermal energy is undesirable. Because of these conflicting factors, the insulation needed for safety and economy of operation can only be a compromise.

In contrast, with dryers constructed according to the invention, the inlet air temperature is intermediate the drying and regeneration temperatures. Consequently, the drying units can be insulated as needed to prevent the addition of thermal energy to a unit which is drying and the loss of thermal energy from a unit that is being regenerated.

I claim:

1. A process for drying gas which comprises passing a stream of the gas to be treated through a refrigeration zone, circulating a refrigeration medium at low temperature in heat transfer relationship with the stream of gas in the refrigeration zone to cool the gas to a temperautre at which a substantial amount of the moisture in the stream is condensed, thereafter passing the stream of gas through a bed of moisture adsorptive material, causing the stream of the gas to be treated to flow through a second bed of moisture adsorptive material when the first named bed reaches a predetermined level of saturation, thereafter continuing to cycle the stream through one bed and then the other bed, compressing the refrigeration medium after it leaves the refrigeration zone, and circulating the compressed refrigeration medium in heat transfer relationship with the offstream bed thereby using the latent heat of condensation absorbed during cooling of the gas in the refrigeration zone to heat the offstream bed for the purpose of regenerating the offstream bed.

2. A process according to claim 1 further including the step of passing a portion of the gas exiting from the onstream bed through the offstream bed.

3. A process according to claim 1 further including using the compressed refrigeration medium to reheat the gas exiting from the onstream bed.

4. A process according to claim 3 wherein the gas exiting from the onstream bed is heated by the compressed refrigeration medium before it is passed through the offstream bed.

5. A process according to claim 3 wherein the gas flow through the offstream bed is counter to the gas flow when the bed is onstream.

6. A method of removing a condensable component from a gas which comprises passing the gas through a cooling zone wherein the condensable component is removed by condensation, then passing the gas through a bed of material which is adsorptive of said component wherein a remaining portion of said component is removed by adsorption, wherein the gas is cooled by circulating a refrigeration medium at a low temperature in heat exchange relationship with the gas in the cooling zone whereby heat is absorbed from the gas, and circulating the medium at a low temperature in heat exchange relationship with the adsorbent material in the bed whereby the heat of adsorption is absorbed from the adsorbent material and the bed is maintained at said low temperature.

7. A method according to claim 6 wherein the component to be removed from the stream is water vapor.

8. A method according to claim 7 comprising the step of discharging heat absorbed by the refrigeration medium into a bed containing saturated adsorbent material thereby restoring said material to a condition in which it is capable of again removing further portions of said component from said gas.

9. A method according to claim 8 wherein the refrigeration medium cools the adsorbent material in the first named bed to a temperature which is about 50°F and heats the bed containing saturated adsorbent material to a temperature of about 130°F.

10. A method of drying gas comprising passing the gas through a cooling zone wherein a component of the gas is removed by condensation, at alternating intervals passing the cooled gas through one of two beds of adsorbent material wherein the remainder of the component is removed by adsorption, circulating a refrigeration medium at a low temperature in heat exchange relationship with the gas in the cooling zone whereby heat is absorbed from the gas, and at alternating intervals circulating the refrigeration medium from the cooling zone to that bed of adsorbent material through which the gas is being passed in heat exchange relationship with the bed whereby the heat of adsorption is transferred to the refrigeration medium.

11. A method of drying gas comprising passing the gas through cooling means wherein water in the gas is removed by condensation, at alternating intervals passing the cooled gas through one of two beds of adsorbent material wherein remaining moisture is removed by adsorption, circulating a refrigeration medium at a low temperature in heat exchange relationship with the gas in the cooling means whereby heat is absorbed from the gas, selectively circulating the medium from the cooling means in heat exchange relationship with that bed of adsorbent material through which the gas is being passed whereby the heat of adsorption is transferred to the refrigeration medium, compressing the refrigeration medium after circulation through that bed through which the gas is being passed, passing the compressed medium in heat exchange relation with that bed of adsorbent material through which the gas from the cooling means is not being passed, whereby said bed is heated and passing a purging gas through that bed of adsorbent material through which the gas from the cooling means is not being passed.

12. A method as defined in claim 11 and further comprising passing the refrigeration medium from the bed of adsorbent material through which the gas is not being passed through a gas expansion device and then in heat exchange relation with the gas in the cooling means.

13. A method as defined in claim 12 further comprising passing the compressed refrigeration medium in heat exchange relationship with the dried gas exiting from the bed which is onstream whereby the dried product gas is reheated.

14. A method as defined in claim 13 in which the gas used for purging the bed of adsorbent material through which the gas being dried is not being passed is a portion of the dried product which was passed in heat exchange relation with the compressed refrigeration medium.

15. A method according to claim 14 wherein the gas is air and wherein the refrigeration medium cools the adsorbent material in the bed through which gas is being passed to a temperature of about 50°F and further wherein the refrigeration medium effects heating of the bed being purged to a temperature of about 130°F.

16. A method of drying gas comprising passing the gas through cooling means wherein the gas temperature is reduced to a low temperature in the range of between about 35°F and 50°F and water in the gas is removed by condensation, at alternating intervals passing the cooled gas through one of two beds of adsorbent material wherein remaining moisture is removed by adsorption, circulating a refrigeration medium at a low temperature in heat exchange relationship with the gas in the cooling means whereby the temperature is reduced and heat is absorbed from the gas, selectively circulating the refrigeration medium from the cooling means in heat exchange relationship with that bed of adsorbent material through which the gas is being passed whereby the heat of adsorption is transferred to the refrigeration medium and the bed is maintained at said low temperature, compressing the refrigeration medium after circulation through the bed through which the gas is being passed, passing the compressed medium in heat exchange relation with that bed of adsorbent material through which the gas from the cooling means is not being passed, and heating the bed to a temperature of about 130° F and passing a purging gas through that bed of adsorbent material through which the gas from the cooling means is not being passed.

17. Apparatus for fractionating gas mixtures comprising a first and second columnar bed each filled with a material which is adsorptive of a component of the gas mixture, refrigeration means for condensing a substantial proportion of the component comprising a gas cooling chamber located centrally of each bed and extending lengthwise thereof, cyclically operable gas flow means including a gas conduit for circulating the gas mixture through the gas cooling chamber associated with the first bed and then through the first bed and thereafter circulating the gas mixture through the gas cooling chamber associated with the second bed and then through the second bed, an evaporator in each said cooling chamber and means for circulating a refrigerant in vapor state through said evaporator, heat transfer means in each of said beds, means for circulating the refrigerant through the heat transfer means in the onstream bed thereby cooling said bed, a compressor for the refrigerant located downstream from the evaporator, means downstream from the compressor for circulating the compressed refrigerant through the heat transfer means in the offstream bed, thereby heating said offstream bed, and means for purging said offstream bed.

18. Apparatus according to claim 17 wherein the means for purging said offstream bed comprises a conduit for circulating a portion of the gas exiting from the onstream bed through said offstream bed.

19. Apparatus for drying a gas stream which comprises a pair of drying columns, each said column comprising a refrigeration section for cooling the gas stream to condense a substantial quantity of the moisture and a bed of moisture adsorptive material downstream from the refrigeration section, gas delivery means including valving for cyclically passing the gas stream through one column and then the other, wherein the refrigeration section extends lengthwise of the bed of moisture adsorptive material within a space located centrally of the bed, wherein the refrigeration section comprises refrigeration conduit means containing a refrigerant for cooling the gas stream, and heat transfer means for transferring the heat absorbed from the gas stream in the refrigeration section of the onstream column to the bed of moisture adsorptive material of the offstream column, said heat transfer means comprising conduit means located in each bed of adsorptive material, and refrigerant delivery means for delivering refrigerant containing the heat energy absorbed in the onstream column to the heat transfer conduit means located in the offstream bed.

20. Apparatus according to claim 19 wherein said refrigeration means comprises further conduit means for circulating cold refrigerant through the heat transfer conduit means of the onstream bed following passage through the refrigerant conduit means in the refrigeration section.

21. Apparatus according to claim 19 wherein each of said columns is covered with a thermal insulating material.

22. Equipment for drying gas comprising gas cooler means in which water is removed from the gas by condensation, said cooler means including product gas inlet and outlet conduits, the cooler means further having a gas inlet means for a refrigerant with means for expanding the refrigerant and the cooler means further having a refrigerant outlet means; a pair of adsorption units each containing adsorbent material, each having an inlet and outlet for circulation of the product gas through the adsorbent material, and each having a refrigerant conduit means for circulation of the refrigerant therethrough in heat exchange relation to the adsorbent material; a compressor for the refrigerant having an inlet and an outlet; a gas conduit system including means providing for delivery of the product gas from the gas cooler means to the product gas inlet of one of the adsorption units; a refrigerant piping system including means providing for connection of the refrigerant outlet means of the gas cooler means with the refrigerant circulation conduit means of the adsorption unit with which the product gas outlet of the cooler means is connected, said refrigerant piping system further including means providing for selective connection of the inlet of the compressor with the refrigerant circulation conduit means of that adsorption unit with which the product gas outlet of the cooler means is connected for receiving refrigerant after the refrigerant has been circulated through said refrigerant circulation conduit means and for selective connection of the outlet of the compressor with the refrigerant circulation conduit means of that adsorption unit with which the gas outlet of the cooler means is not connected for supplying hot refrigerant to the refrigeration circulation conduit means of said last named adsorption unit.

23. Equipment as defined in claim 22 and further including a product gas reheater having a gas inlet and a gas outlet, the gas reheater having a refrigerant circuit connected with the outlet of the compressor, and in which the gas conduit system also includes means providing for connection of the gas inlet of the reheater with the outlet of that adsorption unit to which the gas outlet of the gas cooler is connected.

* * * * *